(12) United States Patent
Weagle

(10) Patent No.: US 9,003,921 B2
(45) Date of Patent: Apr. 14, 2015

(54) REMOVABLE PEDAL PLATFORM

(75) Inventor: David Weagle, Edgartown, MA (US)

(73) Assignee: The Hive Global, Petaluma, CA (US)

( * ) Notice: Subject to any disclaimer, the term of this patent is extended or adjusted under 35 U.S.C. 154(b) by 315 days.

(21) Appl. No.: 11/973,873

(22) Filed: Oct. 10, 2007

(65) Prior Publication Data

US 2009/0095122 A1 Apr. 16, 2009

(51) Int. Cl.
   *B62M 3/08* (2006.01)

(52) U.S. Cl.
   CPC ............. *B62M 3/08* (2013.01); *Y10T 74/20888* (2015.01)

(58) Field of Classification Search
   CPC ................................ B62M 3/08; B62M 3/086
   USPC .............. 74/560, 563, 594.4–594.7; 36/67 D, 36/67 R, 134; 411/403, 410
   See application file for complete search history.

(56) References Cited

U.S. PATENT DOCUMENTS

| | | | |
|---|---|---|---|
| 512,729 A * | 1/1894 | Archer et al. | 74/594.4 |
| 527,384 A | 10/1894 | Davids | |
| 527,520 A * | 10/1894 | Copeland | 74/594.4 |
| 547,639 A | 10/1895 | Grubb | |
| 575,712 A | 1/1897 | Hamilton | |
| 576,548 A | 2/1897 | Cassidy | |
| 579,479 A * | 3/1897 | Gobbler | 74/594.4 |
| 590,685 A | 9/1897 | Matthews | |
| 595,388 A | 12/1897 | Hanson | |
| 598,325 A | 2/1898 | McIntyre | |
| 614,900 A | 11/1898 | Seaver | |
| 616,167 A | 12/1898 | Walker | |
| 620,266 A | 2/1899 | Wodiska | |
| 666,679 A * | 1/1901 | Kraus | 74/594.4 |
| 1,070,971 A | 8/1913 | Lowd | |
| 1,535,601 A | 4/1925 | Graham | |
| 2,024,499 A | 12/1935 | Baron | |
| 2,567,785 A | 9/1951 | Rieger | |
| 2,568,443 A | 9/1951 | Gerner | |
| 2,751,797 A * | 6/1956 | Pearl | 74/594.4 |
| 3,303,720 A | 2/1967 | Jaulmes | |
| 3,382,734 A | 5/1968 | Hussey | |
| 3,485,113 A | 12/1969 | Adcock | |
| 3,592,076 A | 7/1971 | Baginski | |
| 3,760,653 A | 9/1973 | Hagenah | |
| 3,807,255 A | 4/1974 | Baginski | |
| 3,811,339 A | 5/1974 | Konzorr | |
| 3,964,343 A | 6/1976 | Lauterbach | |
| 4,089,236 A | 5/1978 | Genzling | |
| 4,269,084 A | 5/1981 | Okajima | |
| 4,298,210 A | 11/1981 | Lotteau | |
| 4,302,987 A | 12/1981 | Takeda | |
| 4,377,952 A | 3/1983 | Gamondes | |
| 4,398,434 A | 8/1983 | Kimura | |

(Continued)

OTHER PUBLICATIONS

VP Products [online], VP Components, [retrieved Jan. 6, 2008] Retrieved from the Internet, URL: http://www.vpcomponents.com/pedals.asp?pcat2=3.

(Continued)

*Primary Examiner* — Thomas Diaz
(74) *Attorney, Agent, or Firm* — Haverstock & Owens LLP

(57) ABSTRACT

The invention relates to a bicycle pedal which comprises a body, a platform, and a pin, where the pin comprises a traction spike, a thread, a shoulder and a head. The platform is removable, and the platform is constrained in relation to the body by the pin, where the shoulder and head are used to locate the platform away from the body during tightening.

17 Claims, 4 Drawing Sheets

(56) References Cited

U.S. PATENT DOCUMENTS

| | | | |
|---|---|---|---|
| 4,442,732 A | 4/1984 | Okajima | |
| 4,445,289 A * | 5/1984 | Beneteau | 36/134 |
| 4,445,397 A | 5/1984 | Shimano | |
| 4,488,453 A | 12/1984 | Drugeon | |
| 4,506,463 A | 3/1985 | Chassaing | |
| 4,523,492 A | 6/1985 | Shimano | |
| 4,538,480 A | 9/1985 | Trindle | |
| 4,640,151 A | 2/1987 | Howell | |
| 4,646,586 A | 3/1987 | Rapisarda | |
| 4,665,767 A | 5/1987 | Lassche | |
| 4,686,867 A | 8/1987 | Bernard | |
| 4,735,107 A | 4/1988 | Winkie | |
| 4,791,692 A * | 12/1988 | Collins | 12/142 P |
| 4,803,894 A | 2/1989 | Howell | |
| 4,815,333 A | 3/1989 | Sampson | |
| 4,827,633 A | 5/1989 | Feldstein | |
| 4,838,115 A | 6/1989 | Nagano | |
| 4,840,085 A | 6/1989 | Nagano | |
| 4,873,890 A | 10/1989 | Nagano | |
| 4,882,946 A | 11/1989 | Beyl | |
| 4,893,523 A | 1/1990 | Lennon | |
| 4,898,063 A | 2/1990 | Sampson | |
| 4,928,549 A | 5/1990 | Nagano | |
| 4,932,287 A | 6/1990 | Ramos | |
| 4,947,708 A | 8/1990 | Lacombe | |
| 5,003,841 A | 4/1991 | Nagano | |
| 5,014,571 A | 5/1991 | Dapezi | |
| 5,046,382 A | 9/1991 | Steinberg | |
| 5,048,369 A | 9/1991 | Chen | |
| 5,060,537 A | 10/1991 | Nagano | |
| 5,115,692 A | 5/1992 | Nagano | |
| 5,121,935 A | 6/1992 | Mathieu et al. | |
| 5,195,397 A | 3/1993 | Nagano | |
| 5,203,229 A | 4/1993 | Chen | |
| 5,259,270 A | 11/1993 | Lin | |
| 5,379,665 A | 1/1995 | Nagano | |
| 5,419,218 A | 5/1995 | Romano | |
| 5,423,233 A | 6/1995 | Peyre | |
| 5,497,680 A | 3/1996 | Nagano | |
| 5,505,111 A | 4/1996 | Nagano | |
| 5,522,282 A | 6/1996 | Nagano | |
| 5,687,619 A | 11/1997 | Bryne | |
| 5,727,429 A | 3/1998 | Ueda | |
| 5,765,450 A | 6/1998 | Kruger | |
| 5,771,757 A | 6/1998 | Hanamura | |
| 5,806,379 A | 9/1998 | Nagano | |
| 5,927,155 A * | 7/1999 | Jackson | 74/594.4 |
| 5,943,795 A | 8/1999 | Ueda | |
| 6,014,914 A | 1/2000 | Ueda | |
| 6,060,982 A | 5/2000 | Holtrop | |
| 6,490,948 B2 | 12/2002 | Tanaka | |
| 6,520,048 B2 | 2/2003 | Chen | |
| 6,612,201 B1 * | 9/2003 | Chen | 74/594.4 |
| 6,647,826 B2 | 11/2003 | Okajima | |
| 6,725,742 B2 | 4/2004 | Bremer | |
| 6,729,204 B1 | 5/2004 | Chen | |
| 7,013,754 B2 * | 3/2006 | Milanowski | 74/594.6 |
| 7,024,961 B2 | 4/2006 | Hsiao | |
| D522,414 S | 6/2006 | Chen | |
| D524,195 S * | 7/2006 | Neal | D12/125 |
| 7,174,807 B2 | 2/2007 | Bryne | |
| 7,240,587 B2 | 7/2007 | Plassiard | |
| 7,886,947 B2 | 2/2011 | Campagnolo | |
| 8,235,849 B2 | 8/2012 | Cranston et al. | |
| 8,491,429 B2 | 7/2013 | Cranston et al. | |
| 2002/0170382 A1 | 11/2002 | Yang | |
| 2002/0194951 A1 | 12/2002 | Lowe | |
| 2003/0029271 A1 | 2/2003 | Shuman | |
| 2003/0051576 A1 | 3/2003 | Muraoka | |
| 2004/0187635 A1 | 9/2004 | Bryne | |
| 2005/0005729 A1 | 1/2005 | Chen | |
| 2005/0081679 A1 | 4/2005 | Chen | |
| 2005/0252337 A1 | 11/2005 | Chen | |
| 2005/0284253 A1 | 12/2005 | Hervig | |
| 2006/0081088 A1 | 4/2006 | Muraoka | |
| 2006/0236809 A1 | 10/2006 | Bryne | |
| 2006/0266154 A1 | 11/2006 | Hermansen | |
| 2007/0137432 A1 | 6/2007 | Chen | |
| 2007/0204720 A1 | 9/2007 | Poyzer | |
| 2009/0078081 A1 * | 3/2009 | French | 74/594.4 |
| 2013/0053195 A1 | 2/2013 | Emura et al. | |
| 2013/0053196 A1 | 2/2013 | Emura et al. | |

OTHER PUBLICATIONS

VP-58M [online], Pedals, [retrieved Jan. 6, 2008] Retrieved from the Internet, URL: http://www.vpcomponents.com/pedals_show.asp-?pid=205.

* cited by examiner

SECTION A-A

REMOVABLE PEDAL PLATFORM

1.0 FIELD OF THE INVENTION

This invention relates to bicycle pedals and specifically removable pedal platforms.

2.0 BACKGROUND

Various vehicles, like bicycles, use force applied to pedals to drive the vehicles. On these vehicles, pedals are pushed or pulled by a rider's feet and attached to a crank arm mechanism that transforms force at the pedals into rotary motion. This rotary motion is transmitted through a power transmission system to a wheel or wheels, which transfers rotary motion to the ground via tractive force between a wheel or wheels and the ground. Vehicles are also used to traverse even terrain like paved streets, and uneven terrain like off-road dirt trails. Off road trails are generally bumpier and have obstacles such as fallen trees, rocks, and mud. BMX style trick riding is a popular activity on paved streets and in bike parks built for that purpose. Obstacles like paved curbs, stone architectural details, wood benches, and metal rails are commonly found in the street and bike park environments. Because of a bicycle pedal's location close to the ground, impacts with these obstacles are common. Impact between a pedal and an obstacle typically can result in a broken pedal or damage to environmental structures. This damage can pose a safety hazard to both the rider and bystanders. Typical pedals are built using one-piece metal or plastic construction; therefore, when damage to the pedal occurs, the entire pedal must be discarded. This is both wasteful and costly.

A need exists for a bicycle pedal that can withstand impact while remaining cost effective to produce and maintain. The present invention provides new designs for bicycle pedals that can more effectively mitigate impact, reduce damage to architectural details, and are cost effective to repair.

3.0 SUMMARY OF THE INVENTION

The current invention relates to new pedal designs for bicycles. In certain embodiments of the invention, a pedal of the invention can comprise a body, a platform, and a pin, whereby a platform is designed to be a removable and/or a replaceable item. In certain embodiments, platforms are separate parts from a body, and are attached to a body by pins. In certain embodiments, platforms can be designed to work with athletic shoes. In certain embodiments, platforms can be designed to work with cycling clip in shoes.

4.0 BRIEF DESCRIPTION OF THE DRAWINGS

5.0 DETAILED DESCRIPTION

Figure 1:
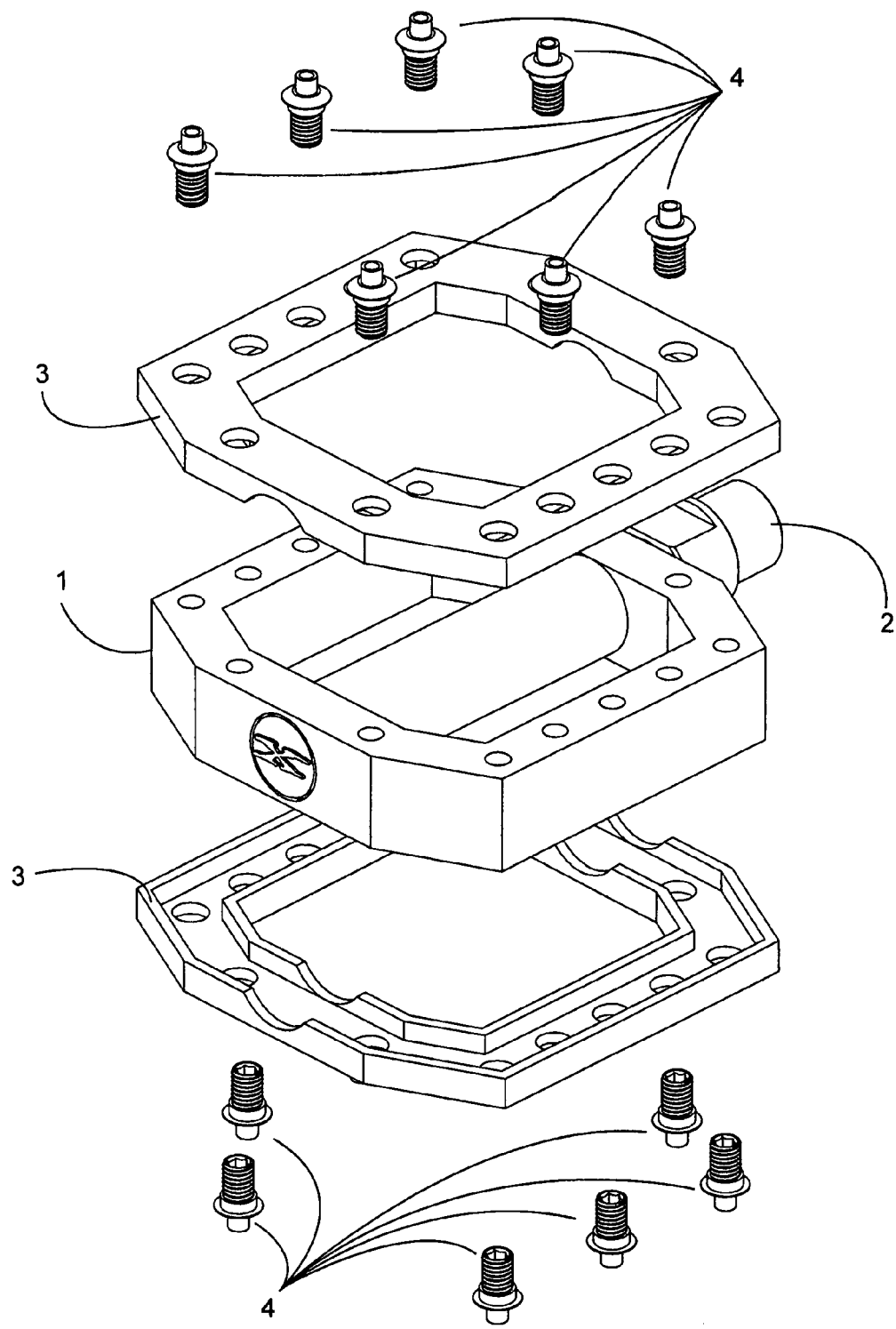
FIG. 1 shows an exploded view of a pedal using a removable platform according to certain embodiments of the current invention.

The current invention relates to new pedal designs for bicycles. In certain embodiments of the invention, a pedal of the invention can comprise a body, platforms, and pins, whereby platforms are designed to be removable and/or replaceable items. In certain embodiments, platforms are separate parts from a body, and are attached to a body by pins. In certain embodiments, platforms can be designed to work with athletic shoes. In certain embodiments, platforms can be designed to work with cycling clip in shoes. In certain embodiments, pins can be threaded into a body. In certain embodiments, pins can secure a platform to a body by compressing a platform between a head of a pin and a body. In certain embodiments, a pin can comprise a shoulder, a head, and a traction spike. In certain embodiments, a shoulder can be a locating feature. In certain embodiments, a shoulder can be part of a body.

5.1 THE DRAWINGS ILLUSTRATE EXAMPLES OF CERTAIN EMBODIMENTS OF THE INVENTION

The Figures in this disclosure use the following numbers and terms; body (1); spindle (2); platform (3); pin (4); body mounting feature (5); locating feature (6); platform mounting feature (7); thread (8); shoulder (9); head (10); tool engagement (11); traction spike (12); pin removal tool (13).

FIG. 1 presents a design for a pedal according to certain embodiments of the current invention via an exploded view. Shown in FIG. 1 are the following: body (1); spindle (2); platform (3); pin (4). A body 1 acts as a structural support for platforms 3, and provides mounting features for pins 4. The body 1 includes a spindle 2, which is intended to be used to couple the pedal to a bicycle crank arm. The spindle 2 can be a replaceable item, separate from the body 1, or part of the body 1. In designs where a spindle 2 is replaceable, the body 1 can be attached to the spindle 2 so as to allow for independent rotation of the body in relation to the spindle 2. In designs where a spindle 2 is replaceable, the spindle 2 can use a threaded boss to mount to a tapped hole in a bicycle crank arm. In designs where a spindle 2 is part of the body 1, or fixedly attached to the body 1, a spindle 2 can use either a threaded boss or non-threaded boss to mount said spindle 2 to bearings in a bicycle crank arm. The pins 4 use threads that mate with mounting features in the body 1. Pins 4 are arranged so that each pin 4 is removable using a pin removal tool, and so that the pin's 4 tool engagement is protected inside the body 1 during impact. This allows for easier pin 4 and platform 3 removal after impact. Pins are also arranged so that each mounting feature locates one pin. Identical platforms 3 are used on two sides of the pedal to save cost.

Figure 2A:
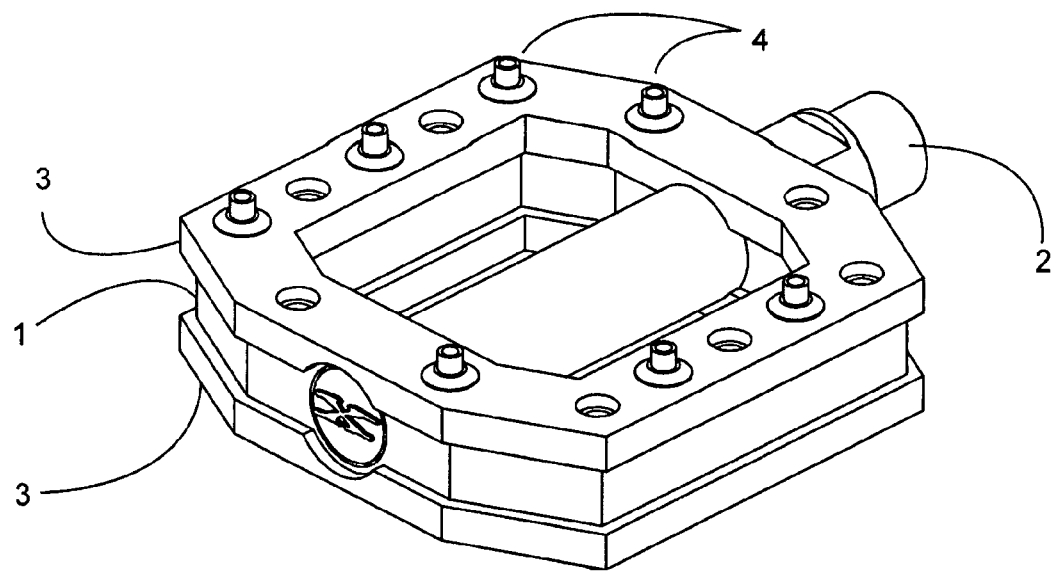
FIG. 2A shows an isometric view of a pedal using a removable platform according to certain embodiments of the current invention.

FIG. 2A presents a design for a pedal shown in FIG. 1 according to certain embodiments of the current invention via an isometric view. Shown in FIG. 2A are the following: body (1); spindle (2); platform (3); pin (4). A body 1 acts as a structural support for platforms 3, and provides mounting features for pins 4. The body 1 includes a spindle 2, which is intended to be used to couple the pedal to a bicycle crank arm. The spindle 2 can be a replaceable item, separate from the body 1, or part of the body 1. In designs where a spindle 2 is replaceable, the body 1 can be attached to the spindle 2 so as to allow for independent rotation of the body in relation to the spindle 2. In designs where a spindle 2 is replaceable, the spindle 2 can use a threaded boss to mount to a tapped hole in a bicycle crank arm. In designs where a spindle 2 is part of the body 1, or fixedly attached to the body 1, a spindle 2 can use either a threaded boss or non-threaded boss to mount said spindle 2 to bearings in a bicycle crank arm. The pins 4 use threads that mate with mounting features in the body 1. Pins 4 are arranged so that each pin 4 is removable using a pin removal tool, and so that the pin's 4 tool engagement is protected inside the body 1 during impact. This allows for easier pin 4 and platform 3 removal after impact. Pins are also arranged so that each mounting feature locates one pin. Identical platforms 3 are used on two sides of the pedal to save cost.

Figure 2B:
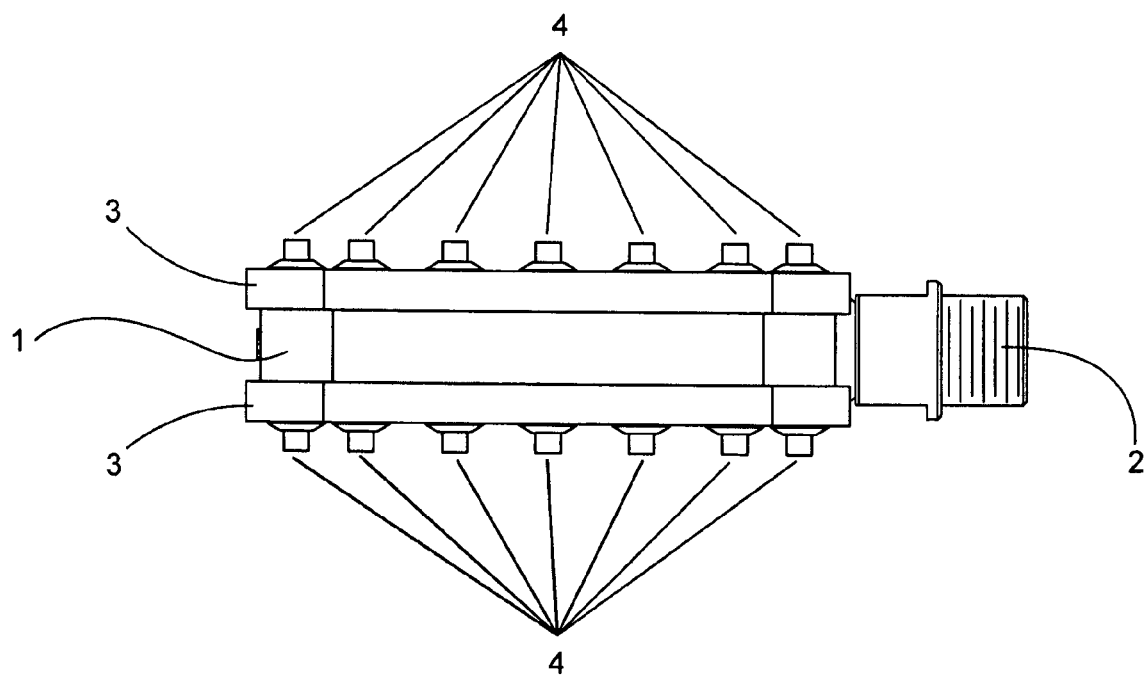
FIG. 2B shows a back view of a pedal using a removable platform according to certain embodiments of the current invention.

FIG. 2B presents a design for a pedal shown in FIG. 1 according to certain embodiments of the current invention via a back view. Shown in FIG. 2B are the following: body (1); spindle (2); platform (3); pin (4). A body 1 acts as a structural support for platforms 3, and provides mounting features for pins 4. The body 1 includes a spindle 2, which is intended to be used to couple the pedal to a bicycle crank arm. The spindle 2 can be a replaceable item, separate from the body 1, or part of the body 1. In designs where a spindle 2 is replaceable, the body 1 can be attached to the spindle 2 so as to allow for independent rotation of the body in relation to the spindle 2. In designs where a spindle 2 is replaceable, the spindle 2 can use a threaded boss to mount to a tapped hole in a bicycle crank arm. In designs where a spindle 2 is part of the body 1, or fixedly attached to the body 1, a spindle 2 can use either a threaded boss or non-threaded boss to mount said spindle 2 to bearings in a bicycle crank arm. The pins 4 use threads that mate with mounting features in the body 1. Pins 4 are arranged so that each pin 4 is removable using a pin removal tool, and so that the pin's 4 tool engagement is protected inside the body 1 during impact. This allows for easier pin 4 and platform 3 removal after impact. Pins are also arranged so that each mounting feature locates one pin. Identical platforms 3 are used on two sides of the pedal to save cost.

Figure 3:
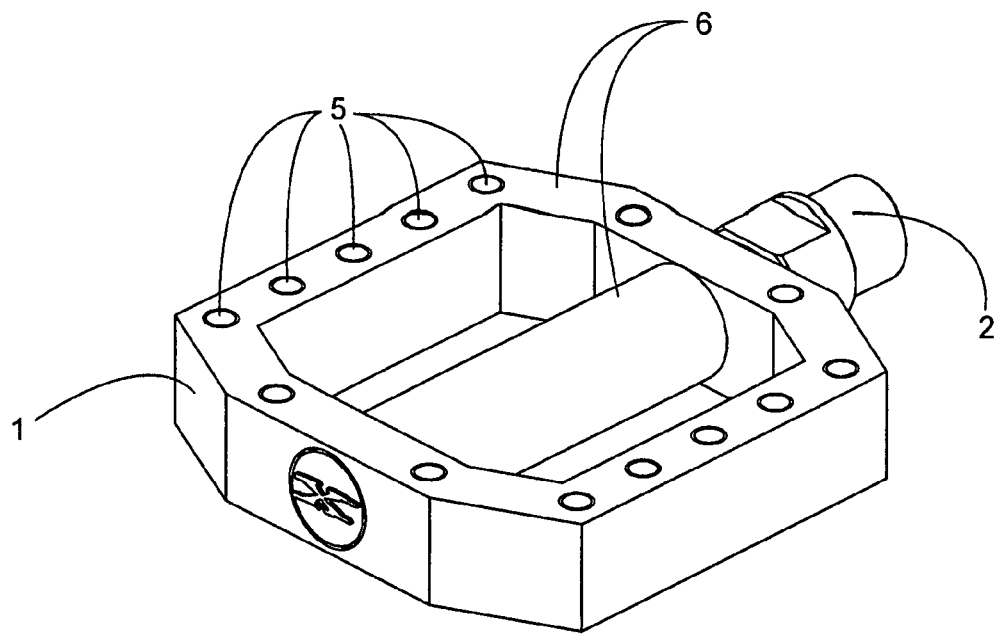
FIG. 3 shows an isometric view of a body of a pedal using a removable platform according to certain embodiments of the current invention.

FIG. 3 presents a design for a body as shown in FIG. 1 and FIG. 2 for a pedal according to certain embodiments of the current invention via a three-dimensional view. Shown in FIG. 3 are the following: body (1); spindle (2); body mounting feature (5); locating feature (6). A body 1 acts as a structural support for platforms, and provides mounting features 5 for pins. The body 1 includes a spindle 2, which is intended to be used to couple the pedal to a bicycle crank arm. The spindle 2 can be a replaceable item, separate from the body 1, or part of the body 1. In designs where a spindle 2 is replaceable, the body 1 can be attached to the spindle 2 so as to allow for independent rotation of the body in relation to the spindle 2. In designs where a spindle 2 is replaceable, the spindle 2 can use a threaded boss to mount to a tapped hole in a bicycle crank arm. In designs where a spindle 2 is part of the body 1, or fixedly attached to the body 1, a spindle 2 can use either a threaded boss or non-threaded boss to mount said spindle 2 to bearings in a bicycle crank arm. A body mounting feature 5 can be a tapped hole, or other hole. A body mounting feature 5 is intended to secure a platform to a body 1 by using a pin as a fastener. A locating feature 6 is used to locate a platform to a body 1 and can be used to mitigate impact at the platform and transfer force from a platform to a body 1.

Figure 4:
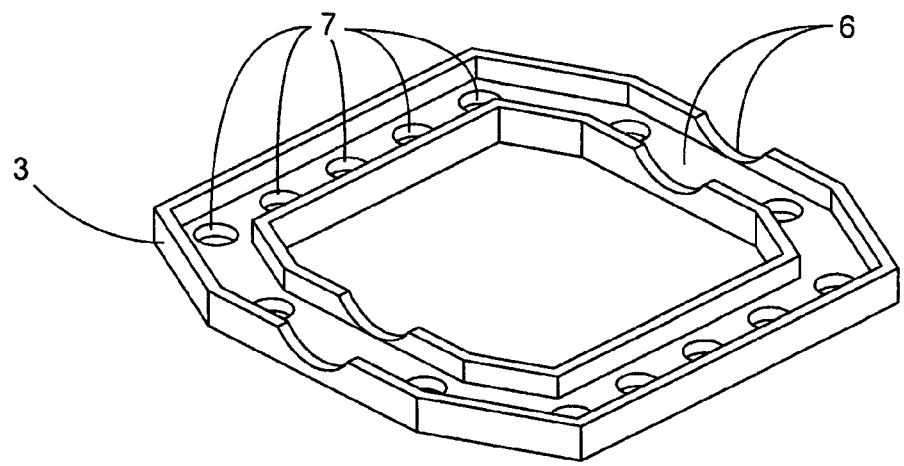
FIG. 4 shows an isometric view of a platform of a pedal using a removable platform according to certain embodiments of the current invention.

FIG. 4 presents a design for a platform as shown in FIG. 1 and FIG. 2 for a pedal according to certain embodiments of the current invention via a three-dimensional view. Shown in FIG. 4 are the following: platform (3); locating feature (6); platform mounting feature (7). A platform 3 is shown so as to expose mounting features 7 and locating features 6. A platform mounting feature 7 can be a tapped hole, or other hole. A platform mounting feature 7 is intended to secure a platform to a body by using a pin as a fastener. A locating feature 6 is used to locate a platform 3 to a body and can be used to mitigate impact at the platform 3 and transfer force from a platform 3 to a body.

Figure 5:
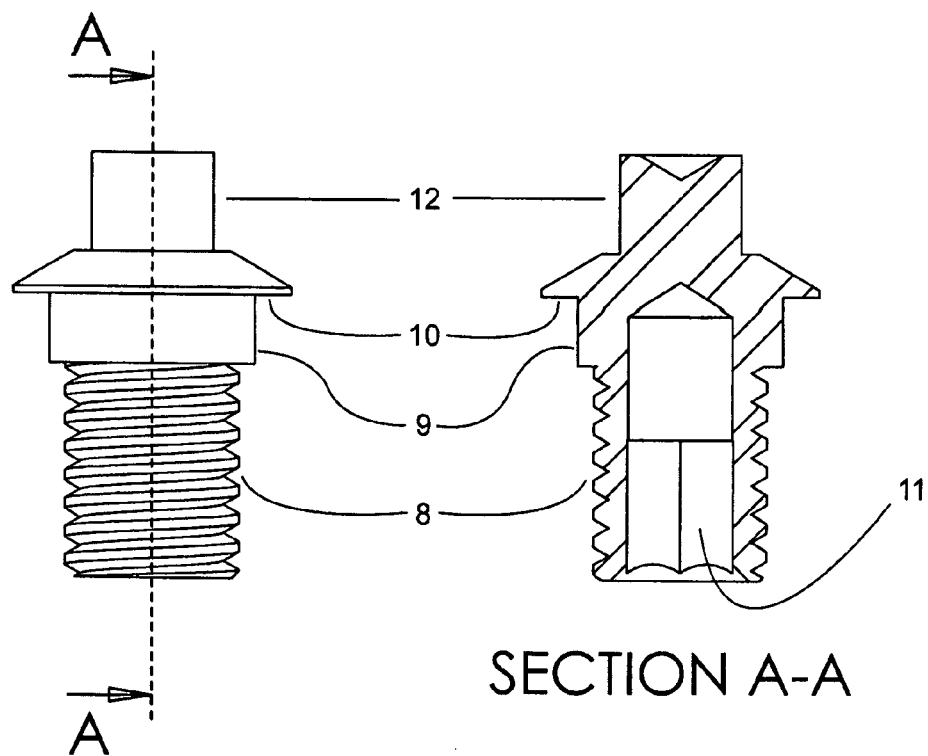
FIG. 5 shows a sectional view of a pin of a pedal using a removable platform according to certain embodiments of the current invention.

FIG. 5 presents a design for a pin as shown in FIG. 1 and FIG. 2 for a pedal according to certain embodiments of the current invention via a sectional view. Shown in FIG. 5 are the following: thread (8); shoulder (9); head (10); tool engagement (11); traction spike (12). A pin can comprise a thread 8, shoulder 9, head 10, tool engagement 11, and traction spike 12. A head 10 can be used to secure a platform to a body. A shoulder 9 can be used to locate a platform to a body, and is also useful to prevent crushing damage to the platform by the head 10 during tightening. A traction spike 12 is intended to create frictional force between an athletic shoe and the pedal. Smooth traction spike 12 designs can be used for minimizing traction with clipless type bicycle specific shoes, and sharper traction spike 12 designs can be used for maximizing traction with athletic shoes. A tool engagement 11 can be used to allow a tool such as a hex wrench, torx wrench, screwdriver, nutdriver, or other type of tool to interface with the pin. A pin removal tool can be used to install or remove a pin, typically by turning the pin to engage threads 8.

Figure 6:
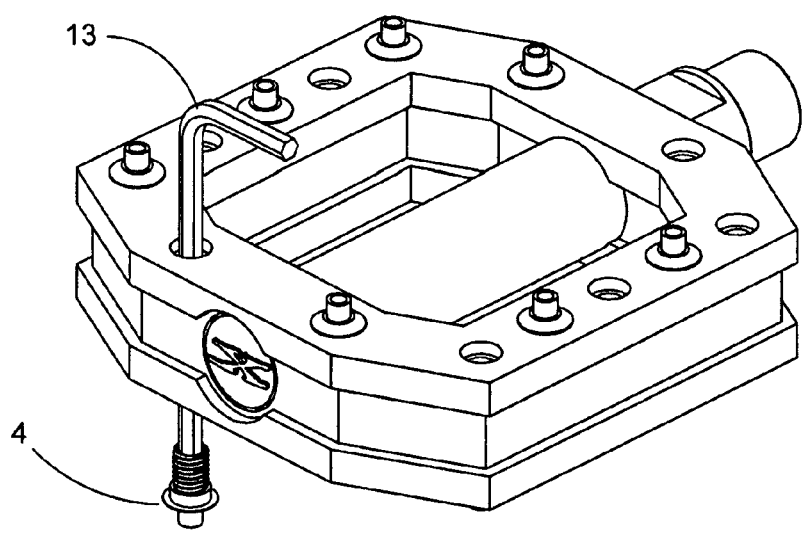
FIG. 6 shows an isometric view of a pin removal procedure of a pedal using a removable platform according to certain embodiments of the current invention.

FIG. 6 presents a depiction of pin removal for the pedal design as shown in FIG. 1 and FIG. 2 for a pedal according to certain embodiments of the current invention via an isometric view. Shown in FIG. 6 are the following: pin (8); pin removal tool (13). A tool engagement can be used to allow a pin removal tool 13 such as a hex wrench, torx wrench, screwdriver, nutdriver, or other type of tool to interface with the pin. A pin removal tool 13 can be used to install or remove a pin 4, typically by turning the pin 4 to engage threads. The pin 4 is removed by engaging the pin removal tool 13 with a tool engagement 11, and turning the pin removal tool 13 in a clockwise direction until the pin 4 unthreads completely from the body. The pin 4 is installed by engaging the pin removal tool 13 with a tool engagement 11, and turning the pin removal tool 13 in a counter clockwise direction until the pin 4 threads completely engage with the body, and locate a platform to said body. Tool engagement can be confined within the body to protect the tool engagement from impact damage. Tool engagement can be externally located to allow for a larger tool engagement.

5.2 BODIES OF PEDALS OF THE INVENTION

A body of a pedal of the current invention, in certain embodiments, comprises a locating feature, mounting feature, platform mounting feature, threaded hole, hole, boss, tab, snap fit feature, spindle receptacle, bore, bearing bore, bushing bore, pin, pins, spikes, traction spikes, clipless pedal spindle, spindle, removable spindle, pin removal tool clearance, thread locking feature, clipless pedal mechanism, foot platform. A body of a pedal of the current invention can be designed to mate with a platform so that the platform and body combine to form a pedal. A body can be manufactured through machining, forging, casting, extrusion, or other methods. A machined, cast, or forged body can in certain embodiments have a structure that defines a perimeter with near vertical walls that act as the structure of the body. An extruded body in can certain embodiments have a structure that is made up of horizontal beams that are machined from an extrusion that is extruded in a direction axial to a pedal spindle mounting axis. A body can include body mounting features which are intended to be used to secure a platform to a body through a fastened connection. A fastened connection could include a bolted, threaded, riveted, or other type of connection. Locating features can in certain embodiments be part of a body design, where the locating features in the body mate with locating features in a platform so as to transfer impact force to the body from the platform. A locating feature can include a boss, tab, slot, hole, or other feature that constrains a platform in any direction in relationship to a body. In certain preferred embodiments, a pedal is thin and more preferrably a pedal is as thin as possible, so as to allow the rider's foot to get as close as possible to a pedal rotation axis. To support this, a pedal in certain embodiments can be constructed from a metal, a light metal, an alloy, aluminum, steel, titanium, and/or magnesium to allow for the thinnest structure around the spindle, and to provide a high strength mounting surface for a platform.

5.3 SPINDLES OF PEDALS OF THE INVENTION

A spindle of a pedal of the current invention, in certain embodiments, comprises a bushing surface, a wear surface, a bearing mounting surface, a bearing race, a bushing race, an axial location feature, a wrench flat, threads, a threaded boss, a mounting boss, a crank arm interface, a clipless pedal locating feature, a clipless pedal mechanism locating feature. In certain other embodiments, a spindle of a pedal of the invention is made of a metal, a light metal, an alloy, a steel, aluminum, titanium and/or magnesium.

5.4 PLATFORMS OF PEDALS OF THE INVENTION

A platform of a pedal of the current invention, in certain embodiments, comprises a foot surface, first concave, second concave, front view concave, side view concave, upper surface, lower surface, mounting boss, locating boss, mounting hole, locating hole, mounting feature, locating feature, platform mounting feature, pin, molded pin, molded traction pin, traction surface, textured surface, thread locking feature, compressible surface, snap together feature, front platform, rear platform, upper platform, lower platform, pin removal tool clearance, end cap cam surface. In certain embodiments, a platform can be secured to a body by a pin. A platform can locate to a body through a variety of mechanical devices, with the most common being a threaded fastener. A platform of a pedal of the current invention can be designed to mate with a body or another platform so that the platform and body combine to form a pedal. A platform can be designed to be used with clipless type or athletic type shoes. Platforms designed for use with clipless type shoes can in certain embodiments use fewer traction pins, and can be designed to provide a smaller area for the shoe to contact. Platforms designed for use with athletic type shoes can in certain embodiments use more traction pins, and can be designed to provide a larger area for the shoe to contact. Platforms can be designed to feature complex surfaces which can provide greater comfort to the user. A concave surface which allows the platform to cradle around the ball of the foot can give the rider a feel of where his or her foot is in relationship to the pedal. This can assist a rider to place the foot accurately on the pedal during difficult riding conditions. Multiple concave surfaces next to a flat surface can allow the rider to feel a raised surface surrounding a flat surface so that the rider can feel where his or her foot is in relationship to the pedal in both front to back and side to side motions. A removable platform can in certain embodiments be constructed by injection molding. Injection molding of the platform can be a cost effective way to built complex platform shapes including concaves, mounting features, locating features, or snap features which can be used to secure, locate, or attach a platform to another platform, a spindle, a body, or a pin. Injection molding is also beneficial because different colors can be easily built into platforms, which can increase visibility to help keep riders on the street safe from vehicle operators. Injection molding thermoplastic resins such as nylon and polycarbonate can be used to manufacture platforms that can exhibit a higher toughness to weight ratio than a metal platform. Removable thermoplastic resin platforms can be advantageous to reduce the effect of impact on the pedal. High impact resistance of the thermoplastic resin is well suited for the impact resistance and abrasion requirement of a pedal body. Because thermoplastic is the same color throughout its volume, as a thermoplastic removable platform is worn away by use, the color of the platform does not get worn away, contributing to the appearance of the pedal. A cam surface that mates with an opposing surface on a pedal cap can be designed into a platform to allow easy removal of a pedal cap, where a pedal cap is designed to seal bearings or bushings in the body from contamination. A platform of the invention in certain embodiments can be attached to a body so that a platform is constrained by the head of a pin in relation to the body. The head of a pin can deform the platform at the contact surface between the head and the platform. A shoulder on the pin, or boss on the body can limit the amount of deformation in the platform axial to the pin's threads by causing the shoulder or head to bottom out on the body at a predetermined distance. A platform compression distance can be from 0 mm to 20 mm, from 0 mm to 10 mm, from 0 mm to 5 mm, from 0 mm to 3 mm, from 0 mm to 1.5 mm, from 0 mm to 1 mm, from 0 mm to 0.5 mm, from 0 mm to 0.25 mm, from 0 mm to 0.15 mm, from 0 mm to 0.05 mm depending on the specific design of the platform.

5.5 PINS OF PEDALS OF THE INVENTION

A pin of a pedal of the current invention, in certain embodiments, comprises a thread, rivet, locking feature, head, shoulder, tool engagement, traction spike, smooth traction spike, sharp traction spike, hex key receptacle, screwdriver receptacle, nut driver boss, hex shaped outer shape, round outer shape. Pins of pedals of the current invention can be used to locate, secure, and or mount platforms to bodies. A pin can include a shoulder that allows the user to thread a pin into a body and apply torque so that the platform is not crushed by the head of the pin. A shoulder and or a thread of a pin can be used in certain embodiments to locate a platform so that the platform is constrained in directions forward and sideways in relationship to a body. A head of a pin can locate a platform so that the platform is constrained in a direction away from the body. A shoulder can be part of a body in some embodiments, where a pin's head is responsible for location of a platform in a direction away from a body.

5.6 BODY MOUNTING FEATURES OF PEDALS OF THE INVENTION

A body mounting feature of a pedal of the current invention, in certain embodiments, comprises a threaded hole, hole, boss, threaded boss, hollow boss with threaded hole, snap together feature. Body mounting features can be used to locate, attach, or constrain a platform in relation to a body.

Body mounting features can work concurrently with features in a platform to constrain platform location in relation to a body.

5.7 PLATFORM MOUNTING FEATURES OF PEDALS OF THE INVENTION

A platform mounting feature of a pedal of the current invention, in certain embodiments, comprises a threaded hole, hole, boss, threaded boss, hollow boss with threaded hole, snap together feature. Platform mounting features can be used to locate, attach, or constrain a platform in relation to a body. Platform mounting features can work concurrently with features in a body or another platform to constrain platform location in relation to a body.

5.8 LOCATING FEATURES OF PEDALS OF THE INVENTION

A locating mounting feature of a pedal of the current invention, in certain embodiments, comprises a threaded hole, hole, boss, threaded boss, hollow boss with threaded hole, snap together feature, tab, slot, pedal perimeter, spindle, interlocking feature. Locating features can be used to locate and or constrain a platform in relation to a body. Locating features in a platform or body can work concurrently with features in a body or another platform to constrain platform location in relation to a body.

5.9 FURTHER EMBODIMENTS OF THE INVENTION

A body, in certain embodiments, may be comprised of a solid beam, a solid bar, a metal bar, a plastic bar, a composite bar, a tube, a metal tube, welding, MIG welding, TIG welding, laser welding, friction welding, a welded tube, a TIG welded tube, a MIG welded tube, a laser welded tube, a friction welded tube, a monocoque section, a monocoque frame, metal monocoque, TIG welded monocoque, MIG welded monocoque, laser welded monocoque, friction welded monocoque, carbon monocoque, Kevlar monocoque, fiberglass monocoque, composite monocoque, fiberglass, carbon fiber, foam, honeycomb, stress skin, braces, extrusion, extrusions, metal inserts, rivets, screws, castings, forgings, CNC machined parts, machined parts, stamped metal parts, progressive stamped metal parts, tubes or monocoque parts welded to cast parts, tubes or monocoque parts welded to forged parts, tubes or monocoque parts welded to machined parts, tubes or monocoque parts welded to CNC machined parts or forged or cast parts, glue, adhesive, injection molding, plastic.

A platform, in certain embodiments, may be comprised of a solid beam, a solid bar, a metal bar, a plastic bar, a composite bar, a tube, a metal tube, welding, MIG welding, TIG welding, laser welding, friction welding, a welded tube, a TIG welded tube, a MIG welded tube, a laser welded tube, a friction welded tube, a monocoque section, a monocoque frame, metal monocoque, TIG welded monocoque, MIG welded monocoque, laser welded monocoque, friction welded monocoque, carbon monocoque, Kevlar monocoque, fiberglass monocoque, composite monocoque, fiberglass, carbon fiber, foam, honeycomb, stress skin, braces, extrusion, extrusions, metal inserts, rivets, screws, castings, forgings, CNC machined parts, machined parts, stamped metal parts, progressive stamped metal parts, tubes or monocoque parts welded to cast parts, tubes or monocoque parts welded to forged parts, tubes or monocoque parts welded to machined parts, tubes or monocoque parts welded to CNC machined parts or forged or cast parts, glue, adhesive, injection molding, plastic.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. Throughout this application the singular includes the plural and the plural includes the singular, unless indicated otherwise. All cited publications, patents, and patent applications are herein incorporated by reference in their entirety.

What is claimed is:

1. A bicycle pedal which comprises a spindle, and a body rotatably coupled to said spindle, a platform, and a pin, wherein said pin comprises a traction spike, a thread, a shoulder and a head, wherein said platform is removable, and wherein said platform is constrained in relation to said body by said pin, whereby said shoulder and said head are used to locate said platform so that the platform is constrained in a direction away from said body and to limit an amount of deformation in the platform axial to threads of the pin.

2. The bicycle pedal of claim 1, wherein said body comprises a locating feature.

3. The bicycle pedal of claim 1, wherein said body comprises a mounting feature.

4. The bicycle pedal of claim 1, wherein said platform comprises a flat surface.

5. The bicycle pedal of claim 1, wherein said platform comprises a concave surface.

6. The bicycle pedal of claim 1, wherein said platform comprises a flat surface and a concave surface.

7. The bicycle pedal of claim 1, wherein said platform comprises a platform compression distance of 0 mm to 5 mm.

8. A bicycle pedal which comprises a spindle, and a body rotatably coupled to said spindle, a platform, and a pin, wherein said pin comprises a traction spike, a thread, a shoulder and a head, wherein said platform is removable, wherein said platform is constrained in relation to said body by said pin, wherein said body comprises a locating feature and a mounting feature, wherein said pin is connected to said body via said thread, whereby said shoulder and said head are used to locate said platform so that the platform is constrained in a direction away from said body and to limit an amount of deformation in the platform axial to threads of the pin.

9. The bicycle pedal of claim 8, wherein said platform comprises a flat surface.

10. The bicycle pedal of claim 8, wherein said platform comprises a concave surface.

11. The bicycle pedal of claim 8, wherein said platform comprises a flat surface and a concave surface.

12. The bicycle pedal of claim 8, wherein said platform comprises a platform compression distance of 0 mm to 5 mm.

13. A bicycle pedal which comprises a spindle, and a body rotatably coupled to said spindle, a platform, and a pin, wherein said pin comprises a thread, a shoulder, a head, a tool engagement, and a traction spike, wherein the head secures said platform to said body, and wherein said shoulder constrains said platform in a direction away from said body and to limit an amount of deformation in the platform axial to threads of the pin, whereby said platform is located away from said body, and wherein said traction spike creates a frictional force between an athletic shoe and said pedal, and wherein said tool engagement allows a pin removal tool to install or remove a pin.

14. The bicycle pedal of claim 13, wherein said platform comprises a flat surface.

15. The bicycle pedal of claim 13, wherein said platform comprises a concave surface.

16. The bicycle pedal of claim 13, wherein said platform comprises a flat surface and a concave surface.

17. The bicycle pedal of claim 13, wherein said platform comprises a platform compression distance of 0 mm to 5 mm.

\* \* \* \* \*